US005395676A

United States Patent [19]

Taka et al.

[11] Patent Number: 5,395,676

[45] Date of Patent: Mar. 7, 1995

[54] THERMAL IMAGE TRANSFER RECORDING MEDIUM

[75] Inventors: Yuichi Taka, Numazu; Keishi Taniguchi, Susono, both of Japan

[73] Assignee: Ricoh Company, Ltd., Tokyo, Japan

[21] Appl. No.: 51,793

[22] Filed: Apr. 26, 1993

Related U.S. Application Data

[63] Continuation of Ser. No. 796,432, Nov. 19, 1991, abandoned.

[30] Foreign Application Priority Data

Nov. 22, 1990 [JP] Japan .................................. 2-320243

[51] Int. Cl.⁶ ................................................ B32B 3/00

[52] U.S. Cl. .................................... 428/195; 428/484; 428/488.1; 428/488.4; 428/913; 428/914

[58] Field of Search ..................... 428/195, 484, 488.1, 428/488.4, 913, 914

[56] References Cited

FOREIGN PATENT DOCUMENTS 0138483 9/1984 European Pat. Off. .

*Primary Examiner*—Patrick J. Ryan
*Assistant Examiner*—Elizabeth Evans
*Attorney, Agent, or Firm*—Oblon, Spivak, McClelland, Maier, & Neustadt

[57] ABSTRACT

A thermal image transfer recording medium is composed of a support, a thermosensitive image transfer layer formed thereon, and a back layer containing a silicone rubber and a silicone oil with a thickness of 0.001 to 0.1 μm formed on the back side of the support opposite to the thermosensitive image transfer layer.

12 Claims, 1 Drawing Sheet

THERMAL IMAGE TRANSFER RECORDING MEDIUM

This application is a continuation of application Ser. No. 07/796,432, filed on Nov. 22, 1991, now abandoned.

BACKGROUND OF THE INVENTION

1. Field of the Invention

The present invention relates to a thermal image transfer recording medium comprising a support, a thermosensitive image transfer layer formed thereon and a back layer with a thickness of 0.001 to 0.1 μm, on the back side of the support, opposite to the thermosensitive image transfer layer, which recording medium is excellent in the transport performance and is capable of producing high quality images.

2. Discussion of Background

Recently a thermosensitive image transfer recording system using a thermal head is widely used because of the advantages that it is noiseless, the apparatus for use in the system is relatively inexpensive and can be made small in size, the maintenance is easy, and printed images are stable in quality.

As a thermosensitive image transfer recording medium for use with the above-mentioned thermosensitive image transfer recording system, for example, a thermosensitive image transfer recording sheet comprising a support such as a polyester film and a thermosensitive image transfer layer (a thermofusible ink layer) formed thereon which comprises a wax such as a natural wax or synthetic wax, a coloring agent, and a thermoplastic resin is employed.

Such a conventional thermosensitive image transfer recording medium has the disadvantages that the transport performance is unsatisfactory and the heat resistance of a surface thereof in contact with a thermal head is low.

In order to remove the above disadvantages, there are proposed a variety of thermal image transfer recording media having a back layer comprising materials with excellent lubricating properties and heat resistance, which is provided at the back side of the support. For example, a thermal image transfer recording medium comprising a heat-resistant protective film with a thickness of 0.5 to 5 μm, serving as a back layer which is prepared by coating a silicone resin on the back side of a support and drying it at temperatures of 150° to 200° C., is disclosed in Japanese Patent Publication 58-13359; a thermal image transfer recording medium comprising a back layer which comprises a wax or oil, is disclosed in Japanese Laid-Open Patent Application 59-148697; a thermal image transfer recording medium comprising a back layer which is a thin film of a silicone rubber is disclosed in Japanese Laid-Open Patent Applications 62-33682 and 62-109688; and a thermal image transfer recording medium comprising a back layer made of a condensation-type silicone rubber is disclosed in Japanese Laid-Open Patent Application 1-141789. In addition, there is proposed a method of supplying a thermal head or the back side of a thermal image transfer recording medium with oil in the course of printing operation, as disclosed in Japanese Laid-Open Patent Application 59-196293.

Although, in such conventional thermal image transfer recording media, the lubricating properties and the heat resistance are improved to a certain degree, they are still unsatisfactory for practical use. For example, a silicone resin is suitable for a heat-resistant protective film because a heating loss thereof is as small as about 5% up to temperatures of 550° C. However, when back layer comprising a silicone resin with a high heat resistance is provided on the back side of the support in order to prevent the recording medium from sticking to a thermal head, the thickness of the back layer is necessarily increased to 0.5 μm or more, as disclosed in Japanese Patent Publication 58-13359. In the case where the thickness of the back layer is thin, the heat resistance thereof is lowered. On the other hand, the thickness of the back layer becomes thick, the sensitivity and the lubricating properties thereof deteriorate.

In the prevailing high-speed thermal printer, for the purpose of improving the image quality, the thermal image transfer recording medium is caused to pass between a hard platen roll and a thermal head, with the pressure applied to the recording medium by the thermal head increased, so that the transport performance of the thermal image transfer recording medium becomes poor and the above-mentioned conventional back layer easily sticks to a thermal head. Moreover, when high energy is applied to the image transfer recording medium from the thermal head, the thermal image transfer recording medium is cut off. Further, in the case where the back layer comprises a silicone resin with a high crosslinking density for the purpose of imparting the high heat resistance to the back layer, the back layer becomes so hard that the thermal head is easily abraded when the recording medium is repeatedly caused to pass through the thermal head.

Moreover, to obtain a silicone resin with a high cross linking density for use in the back layer, it is necessary to heat the resin at high temperatures for a long time. This induces the contraction of the support film, and consequently, the obtained image quality is degraded or the productivity of the recording medium is lowered.

The conventional thermal image transfer recording medium comprising the back layer made of a wax or oil has the lubricating properties. However, when this type of recording medium is rolled, the low-molecular-weight material of the oil or wax contained in the back layer readily transfers to the adjacent ink layer. As a result, the lubricating properties of the back layer are lowered and the image fixing properties are decreased.

With respect to the method of supplying a thermal head or a back side of the recording medium with oil in the course of the printing operation, it is necessary to equip a printer with an oil feeding apparatus, even though the previously mentioned shortcomings are overcome.

The conventional thermal image transfer recording medium having a back layer of a silicone resin thin film does not have sufficient lubricating properties.

In addition, the conventional thermal image transfer recording medium having a back layer comprising a condensation-type silicone rubber has the shortcoming that it is necessary to apply the thermal energy thereto to dry the water generated from the silicone rubber.

SUMMARY OF THE INVENTION

Accordingly, an object of the present invention is to provide a thermal image transfer recording medium which is excellent in the lubricating properties and the transport performance.

Another object of the present invention is to provide a thermal image transfer recording medium which is capable of high quality images, with the thermal hysteresis of a support thereof being minimized.

The above-mentioned objects of the present invention can be achieved by a thermal image transfer recording medium comprising a support, a thermosensitive image transfer layer formed thereon, and a back layer with a thickness of 0,001 to 0.1 μm formed on the back side of the support, which comprises a mixture of a silicone rubber and a silicone oil.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the accompanying drawings, the present invention will be explained in detail.

Figure 1:
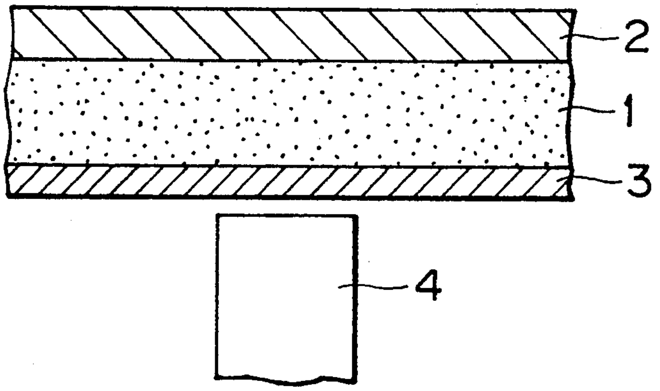
FIG. 1 is a schematic cross-sectional view of an example of the thermal image transfer recording medium according to the present invention.

In FIG. 1, the thermal image transfer recording medium according to the present invention comprises a support 1, a thermosensitive image transfer layer (thermofusible ink layer) 2 formed on the support 1 and a back layer 3 formed on the back side of the support 1 which is opposite to the thermosensitive image transfer layer 2. When images are transferred to an image-receiving sheet, heat is applied to the back layer 3 of the thermal image transfer recording medium using a thermal head 4. Then, a part of ink contained in the thermosensitive image transfer layer 2 is fused, peeled off and transferred to the image-receiving sheet. The thermosensitive image transfer layer 2 may be of a single-layered type or of a multi-layered type.

Figure 2:
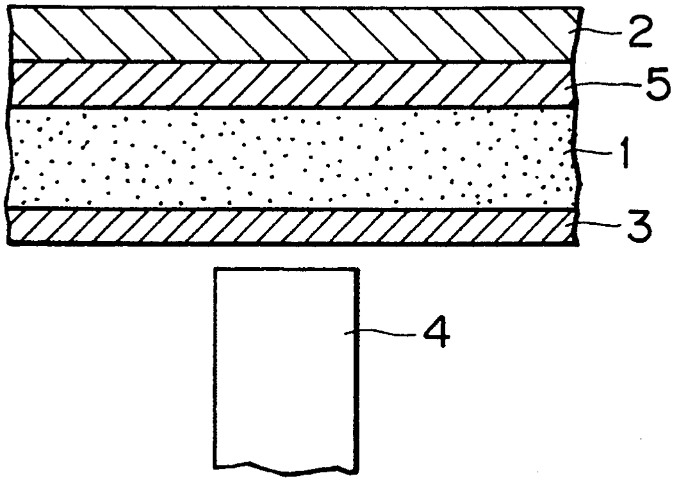
FIG. 2 is a schematic cross-sectional view of another example of the thermal image transfer recording medium according to the present invention.

In the thermal image transfer recording medium according to the present invention as shown in FIG. 2, a release layer 5 is interposed between a support 1 and a thermosensitive image transfer layer 2.

On the back side of the support of the thermal image transfer recording medium according to the present invention, as mentioned above, a back layer comprising a mixture of a silicone rubber and a silicone oil, with a thickness of 0.001 to 0.1 μm is formed.

It is preferable that the silicone rubber for use in the back layer comprise a polyalkyl alkenyl siloxane. In this case, the number of carbon atoms in an alkyl group is preferably in the range of 1 to 18. Preferable examples of such an alkyl group are a methyl group and a phenyl group. Examples of the alkenyl group are a vinyl group and an allyl group. Moreover, the amount ratio of the alkenyl group to the total amount of the alkyl group and the alkenyl group in the polyalkyl alkenyl siloxane is preferably in the range of 0.02 to 0.3 mol.%.

As a curing agent used for curing the silicone rubber, a platinum-type catalyst such as chloroplatinic acid is employed to progress the addition polymerization of a vinyl group, which is introduced into a bifunctional straight-chain polyalkyl siloxane in order to extend it in a plane direction.

The back layer for use in the present invention is so thin that the components of the back layer scarcely transfer to the adjacent ink layer when the thermal image transfer recording medium is rolled. Therefore, the silicone rubber contained in the back layer may not be necessarily cured, with the thermal hysteresis taken into consideration.

Examples of the silicone oil for use in the back layer include dimethyl silicone oil, methylphenyl silicone oil and modified oils thereof with a viscosity in the range of 1,000 to 3,000,000 cps (at 25° C.), and more preferably in the range of 5,000 to 2,000,000 cps.

It is preferable that the ratio by weight of the silicone rubber to the silicone oil be in the range of (99:1) to (50:50). When the ratio thereof is within the above range, the back layer of the thermal image transfer recording medium shows the sufficient lubricating properties without bleeding, so that the components of the back layer do not readily transfer to the adjacent thermofusible ink layer when the recording medium is rolled.

The viscosity of the mixture of the silicone rubber and the silicone oil may be appropriately adjusted so as to thoroughly mix the above two components and not to cause the bleeding.

It is preferable that the thickness of the back layer comprising the mixture of the silicone rubber and the silicone oil be in the range of 0.001 to 0.1 μm, more preferably in the range of 0.008 to 0.08 μm. When the thickness thereof is too thin, the sufficient lubricating properties can not be obtained. When the thickness of the back layer is too thick, on the other hand, the back layer easily tends to deform, which increases the resistance to the lubricating properties thereof. It is preferable that the coefficient of dynamic friction of the back layer for use in the present invention be 0.1 or less.

When it is necessary to cure the mixture of the silicone rubber and the silicone resin for use in the back layer, it may be dried at about 120° C. for about 30 seconds. When it is not necessary to completely cure the mixture, the mixture may be dried at 40° to 100° C. for 3 to 15 seconds, in such a degree that the solvent component in the mixture may be caused to volatilize. The mixture is cured at high temperatures, as described above, in order to remove the alkali, serving as a polymerization inhibitor, from the mixture.

The support for use in the present invention can be made of, for example, a film of plastic materials such as polyester, polycarbonate, triacetyl cellulose and nylon. It is preferable that the support have a thickness of about 2 to 25 μm.

In the thermosensitive image transfer recording medium of the present invention, the thermosensitive image transfer layer with the conventional structure, comprising a lubricant, a resin and a coloring agent may be employed.

Examples of the lubricant for use in the thermosensitive image transfer layer include carnauba wax, candelilla wax, paraffin wax, polyethylene wax, stearyl-amide, stearic acid and cetyl alcohol.

Examples of the resin are styrene resin, epoxy resin, ethylene-vinyl acetate copolymer resin, polyester resin, acrylic resin, polyamide resin, polyacetal resin, vinyl chloride resin, polyolefin resin, guanamine resin, phenolic resin, urethane resin and ethylene tetrafluoride resin.

The coloring agent for use in the thermosensitive image transfer layer can be selected from organic and inorganic dyes and pigments which are used as printing ink or dyes. Examples of above coloring agent include pigments such as carbon black, lake red C, benzidine yellow, phthalocyanine green, phthalocyanine blue, titanium dioxide, black iron oxide, red oxide; and dyes such as direct dyes, oil-soluble dyes, basic dyes, and acid dyes.

The mixture of a silicone rubber and a silicone oil for use in the back layer is inferior in the heat resistance to the silicone resin, which is conventionally used for the back layer, but superior thereto in the sticking preventing effect. It is considered this is because the transport performance of the thermal image transfer recording medium of the present invention is excellent due to the improved lubricating properties of the back layer thereof. Therefore, the recording medium of the present invention can smoothly pass through the thermal head before the support film is fused and tends to stick to the thermal head. Accordingly, the effect of preventing the sticking problem is increased.

Further, a primer layer may be interposed between the support and the back layer to improve the adhesion strength therebetween. Moreover, an overcoat layer may be formed on the thermosensitive image transfer layer to improve the thermosensitivity and the image fixing properties.

In the thermal image transfer recording medium according to the present invention, a back layer which comprises a mixture of a silicone rubber and a silicone oil, with a thickness of 0.001 to 0.1 μm, is formed on the back side of a support, so that the lubricating properties and the transport performance of the recording medium are excellent. Moreover, the back layer for use in the preset invention is remarkably thin and can be prepared without a high-temperature curing process over a long period of time. The quality of the images obtained by using the thermal image transfer recording medium according to the present invention is high since the thermal hysteresis of the recording medium is small. Further, the thermal image transfer recording medium according to the present invention is excellent from the view points of the productivity and the manufacturing cost.

Other features of this invention will become apparent in the course of the following description of exemplary embodiments, which are given for illustration of the invention and are not intended to be limiting thereof.

Example 1

[Formation of Back Layer]

The following components were mixed to prepare a back layer coating liquid:

| | Parts by Weight |
|---|---|
| Polymethyl vinyl silicone (vinyl content: 0.1 mol. %) | 97 |
| Dimethyl silicone oil (viscosity: 1,500,000 cps (25° C.)) | 30 |
| Chloroplatinic acid | 3 |
| Toluene | 10,000 |

The above prepared back layer coating liquid was coated on a polyester (PET) film with a thickness of 4.5 μm using a smoother and dried at 80° C. for 10 seconds, so that a back layer with a thickness of 0.02 μm was formed on the PET film.

[Formation of Release Layer]

The following components were dispersed in a ball mill for 8 hours to prepare a release layer coating liquid:

| | Parts by Weight |
|---|---|
| Carnauba wax | 85 |
| Ethylene/vinyl acetate copolymer resin (Trademark "Evaflex 410" made by Du Pont-Mitsui Polychemicals Co., Ltd.) | 15 |
| Toluene | 900 |

The above prepared release layer coating liquid was coated on the other side of the PET film, opposite to the back layer, and dried at 40° C. for 10 seconds, so that a release layer with a thickness of 1.5 μm was formed on the PET film.

[Formation of Thermosensitive Image Transfer Layer]

The following components were dispersed in a ball mill for 12 hours to prepare a thermosensitive image transfer layer coating liquid:

| | Parts by Weight |
|---|---|
| Carnauba wax | 70 |
| Carbon black | 20 |
| Styrene resin (Trademark "Himer ST-95" made by Sanyo Chemical Industries, Ltd.) | 10 |
| Toluene | 900 |

The above prepared thermosensitive image transfer layer coating liquid was coated on the above prepared release layer and dried at 70° C. for 10 seconds, so that a thermosensitive image transfer layer with a thickness of 2μm was formed on the release layer.

Thus, a thermal image transfer recording medium according to the present invention was obtained.

Example 2

The procedure for preparation of the thermal image transfer recording medium in Example 1 was repeated except that the back layer coating liquid used in Example 1 was dried at 120° C. for 30 seconds, to prepare a back layer, whereby a thermal image transfer recording medium according to the present invention was prepared.

Example 3

The procedure for preparation of the thermal image transfer recording medium in Example 1 was repeated except that the formation order of the back layer, the release layer, the thermosensitive image transfer layer employed in Example 1 was replaced by the order of the release layer, the thermosensitive image transfer layer, the back layer, and that the back layer coating liquid was dried at 50° C. for 15 seconds, to prepare a back layer, whereby a thermal image transfer recording medium according to the present invention was prepared.

Example 1

The procedure for preparation of the thermal image transfer recording medium in Example 1 was repeated except that the formulation for the back layer coating liquid in Example 1 was changed to the following formulation for a back layer coating liquid and that the thickness of the back layer was changed from 0.2 $\mu m$ to 0.04 $\mu m$:

| | Parts by Weight |
|---|---|
| Polymethyl vinyl silicone (vinyl content: 0.2 mol. %) | 97 |
| Dimethyl silicone oil (viscosity: 3,000-cps (25° C.)) | 5 |
| Chloroplatinic acid | 3 |
| Toluene | 5,000 |

Thus, a thermal image transfer recording medium according to the present invention was obtained.

Comparative Example 1

The preparation of the back layer coating liquid in Example 1 was repeated except that the amount of toluene in the formulation for the back layer coating liquid used in Example 1 was changed from 10,000 to 500 parts by weight.

The thus prepared back layer coating liquid was coated on a PET film with a thickness of 4.5 $\mu m$ using a wire bar with a diameter of 0.5 mm, in a coating thickness of 3 $\mu m$, and dried at 80° C. for 10 seconds.

The back layer coating liquid was considerably sticky, so that the back layer was not prepared on the PET film.

Comparative Example 2

The same back layer coating liquid as used in Comparative Example 1 was coated on a PET film with a thickness of 4.5 $\mu m$ using a wire bar having a diameter of 0.5 mm and dried at 120° C. for 2 minutes, whereby a back layer with a thickness of 3 $\mu m$ was formed on the PET film.

Then, the procedure for formation of the release layer and the thermosensitive image transfer layer in Example 1 was repeated, so that a release layer was formed on the other side of the PET film, opposite to the back layer, and a thermosensitive image transfer layer was formed on the release layer.

Thus, a comparative thermal image transfer recording medium was prepared. Comparative Example 3

[Preparation of Back Layer Coating Liquid]

The following components were mixed to prepare a back layer coating liquid:

| | Parts by Weight |
|---|---|
| Silicone resin (Trademark "KR266" made by Shin-Etsu Chemical Co., Ltd.) | 10 |
| Curing agent (Trademark "D-11" made by Shin-Etsu Chemical Co., Ltd.) | 1 |
| Toluene | 49 |

[Formation of Back Layer]

The above prepared back layer coating liquid was coated on a PET film with a thickness of 4.5 $\mu m$ by a wire bar with a diameter of 0.5 mm, and dried at 150° C. for 20 minutes for curing, so that a back layer with a thickness of 3 $\mu$was formed on one side of the PET film. After a drying operation, the PET film contracted and the wrinkles were observed thereon.

The procedure for formation of the release layer and the thermosensitive image transfer layer in Example 1 was repeated, so that a release layer was formed on the other side of the PET film, opposite to, the back layer, and a thermosensitive image transfer layer was formed on the release layer.

Thus, a comparative thermal image transfer recording medium was obtained.

Comparative Example 4

[Preparation of Back Layer Coating Liquid]

The following components were mixed to prepare a back layer coating liquid:

| | Parts by Weight |
|---|---|
| Silicone resin (Trademark "KR255" Shin-Etsu Chemical Co., Ltd.) | 10 |
| Toluene | 50 |

[Formation of Back Layer]

The above prepared back layer coating liquid was coated on a PET film with a thickness of 4.5 $\mu m$ using a wire bar with a diameter of 0.5 mm, and dried at 100° C. for 10 minutes for curing, so that a back layer with a thickness of 5 $\mu m$ was formed on one side of the PET film.

The procedure for formation of the release layer and the thermosensitive image transfer layer in Example 1 was repeated, so that a release layer was formed on the other side of the PET film, opposite to the back layer, and a thermosensitive image transfer layer was formed on the release layer.

Thus, a comparative thermal image transfer recording medium was prepared.

Comparative Example 5

[Preparation of Back Layer Coating Liquid]

The following components were mixed to prepare a back layer coating liquid:

| | Parts by Weight |
|---|---|
| Silicone resin (Trademark "KR2610B" made by Shin-Etsu Chemical Co., Ltd.) | 10 |
| Curing agent (Trademark "D-2610" made by Shin-Etsu Chemical Co., Ltd.) | 0.04 |
| Toluene | 50 |

[Formation of Back Layer]

The above prepared back layer coating liquid was coated on a PET film with a thickness of 4.5 $\mu m$ using a wire bar with a diameter of 0.5 mm, and dried at 120° C. for 60 minutes for curing, so that a back layer with a thickness of 0.5 was formed on one side of the PET film.

The procedure for formation of the release layer and the thermosensitive image transfer layer in Example 1 was repeated, so that a release layer was formed on the other side of the PET film, opposite to the back layer, and a thermosensitive image transfer layer was formed on the release layer.

Thus, a comparative thermal image transfer recording medium was obtained.

Comparative Example 6

[Preparation of Back Layer Coating Liquid]

The following components were mixed to prepare a back layer coating liquid:

| | Parts by Weight |
|---|---|
| Silicone resin (Trademark "KR255" Shin-Etsu Chemical Co., Ltd.) | 10 |
| Toluene | 1,000 |

[Formation of Back Layer]

The above prepared back layer coating liquid was coated on a PET film with a thickness of 4.5 μm using a smoother, and dried at 100° C. for 10 minutes for curing, so that a back layer with a thickness of 0.02 μm was formed on one side of the PET film.

The procedure for formation of the release layer and the thermosensitive image transfer layer in Example 1 was repeated, so that a release layer was formed on the other side of the PET film, opposite to the back layer, and a thermosensitive image transfer layer was formed on the release layer.

Thus, a comparative thermal image transfer recording medium was prepared.

Comparative Example 7

[Preparation of Back Layer Coating Liquid]

The following components were mixed to prepare a back layer coating liquid:

| | Parts by Weight |
|---|---|
| Dimethyl silicone oil (viscosity: 3,000 cps (25° C.)) | 10 |
| Toluene | 1,000 |

The above prepared back layer coating liquid was coated on a PET film with a thickness of 4.5 μm using a smoother, and dried at 80° C. for 10 seconds for curing, so that a back layer with a thickness of 0.02 μm was formed on one side of the PET film.

The procedure for formation of the release layer and the thermosensitive image transfer layer in Example 1 was repeated, so that a release layer was formed on the other side of PET film, opposite to the back layer, and a thermosensitive image transfer layer was formed on the release layer.

Thus, a comparative thermal image transfer recording medium was obtained.

Comparative Example 8

The comparative thermal image transfer recording medium obtained in Comparative Example 7 was rolled and stored at 40° C. for 12 hours. Example 5

The thermal image transfer recording medium according to the present invention obtained in Example 1 was rolled and stored at 40° C. for 12 hours.

The dynamic friction coefficient of each of the above obtained thermal image transfer recording media in Examples 1 to 5 and the comparative thermal image transfer recording media in Comparative Examples 1 to 8 was measured to evaluate the lubricating properties thereof, and each recording medium was subjected to the transport performance test and the static heat resistance test.

The results are shown in Table 1, and the measuring method and the test conditions are as follows:

1) Measurement of the coefficient of dynamic friction

The dynamic friction coefficient of each thermal image transfer recording medium was measured in such a manner that a steel ball was placed on the back layer of each recording medium and caused to roll thereon at a speed of 75 mm/min, with a load of 50 g applied to the steel ball, using a commercially available surface property tester, "Heidon" (Trademark), made by Shinto Scientific Co., Ltd.

(2) Evaluation of transport performance

The transport performance of each thermal image transfer recording medium was evaluated using a commercially available thermal image transfer simulator made by Ookura Denki Co., under the following conditions:

Thermal head: Trademark "KMT" made by Kyocera Corp.
Applied pressure by thermal head: 300 g/cm$^2$
Tension of the thermal image transfer recording medium: 1400 g.cm
Printing speed: 2 inches/sec.
Applied energy: 30 mj/mm$^2$
Applied pulse: continuously 320 pulse on all the lines Evaluation Standard:

∘ . . . The thermal image transfer recording medium was not cut off, and the sticking problem did not occur.

× . . . The thermal image transfer recording medium was not at all transported and, finally cut off due to the sticking problem.

Δ . . . The thermal image transfer recording medium was slightly transported, but finally cut off due to the sticking problem.

(3) Evaluation of static heat resistance

The static heat resistance of the back layer of each recording medium was evaluated using a commercially available thermal image transfer simulator made by Ookura Denki Co., under the following conditions:

Thermal head: Trademark "KMT" made by Kyocera Corp.
Applied pressure by thermal head: 300 g/cm$^2$
Applied energy: 30 mj/ram$^2$
Applied energy: continuously 64 pulse on all the lines Evaluation Standard ∘ . . . The thermal image transfer recording medium was not cut off.

× . . . The thermal image transfer recording medium was cut off.

TABLE 1

| | Coefficient of Dynamic Friction | Transport Performance | Static Heat Resistance |
|---|---|---|---|
| Ex. 1 | 0.04 | ∘ | x |
| Ex. 2 | 0.04 | ∘ | x |
| Ex. 3 | 0.04 | ∘ | x |
| Ex. 4 | 0.03 | ∘ | x |
| Ex. 5 | 0.04 | ∘ | x |
| Comp. Ex. 1 | — | — | — |
| Comp. Ex. 2 | 0.06 | x | ∘ |
| Comp. Ex. 3 | 0.6 | x | ∘ |
| Comp. Ex. 4 | 0.8 | x | ∘ |
| Comp. Ex. 5 | 0.4 | x | ∘ |
| Comp. Ex. 6 | 0.2 | Δ | x |
| Comp. Ex. 7 | 0.04 | ∘ | x |
| Comp. Ex. 8 | 0.2 | Δ | x |

As can be seen from the results in Table 1, the thermal image transfer recording media according to the present invention have the improved lubricating properties, so that the transport performance thereof is excellent, although the static heat resistance thereof is not so high as compared with some of the comparative thermal image transfer recording media. Therefore, the image transfer recording media according to the present invention can be transported without the cutting of the recording medium and the sticking problem under the practical printing conditions. In addition, the recording media of the present invention are excellent for practical use due to their small thermal hysteresis.

In the case where the back layer only comprises a silicone oil as shown in Comparative Example 7, the silicone oil contained in the back layer easily transfers to the adjacent thermosensitive image transfer layer when the recording medium is rolled as in Comparative Example 8. As a result, the transport performance of the recording medium obtained in Comparative Example 8 considerably deteriorates, so that it cannot be used in practice.

What is claimed is:

1. A thermal image transfer recording medium comprising a support, a thermosensitive image transfer layer formed on said support, and a back layer comprising a mixture of a silicone rubber and a silicone oil with a thickness of 0.001 to 0.1 μm, formed on the back side of said support opposite to said thermosensitive image transfer layer, wherein the ratio by weight of said silicon rubber to said silicone oil in said mixture is in the range of 99:1 to 50:50.

2. The thermal image transfer recording medium as claimed in claim 1, wherein said silicone rubber for use in said back layer comprises a polyalkyl alkenyl siloxane.

3. The thermal image transfer recording medium as claimed in claim 1, wherein said back layer has a thickness in the range of 0.008 to 0.08 μm.

4. The thermal image transfer recording medium of claim 3, wherein said back layer has a thickness of from 0.02 to 00.4 μm.

5. The thermal image transfer recording medium of claim 3, wherein said back layer consists essentially of said silicone rubber and said silicone oil.

6. The thermal image transfer recording medium as claimed in claim 1, wherein said silicone oil for use in said back layer is selected from the group consisting of dimethyl silicone oil, methylphenyl silicone oil and modified oils of said silicone oil.

7. The thermal image transfer recording medium as claimed in claim 1, wherein said silicone oil for use in said back layer has a viscosity of 1,000 to 3,000,000 cps at 25° C.

8. The thermal image transfer recording medium as claimed in claim 1, wherein said support is selected from the group consisting of polyester, polycarbonate, triacetyl cellulose and nylon.

9. The thermal image transfer recording medium as claimed in claim 1, wherein said thermosensitive image transfer layer comprises a lubricant, a resin and a coloring agent.

10. The thermal image transfer recording medium as claimed in claim 1, further comprising a release layer, which is provided between said support and said thermosensitive image transfer layer.

11. The thermal image transfer recording medium as claimed in claim 1, further comprising a primer layer, which is interposed between said support and said back layer.

12. The thermal image transfer recording medium as claimed in claim 1, further comprising an overcoat layer, which is provided on said thermosensitive image transfer layer.

* * * * *

UNITED STATES PATENT AND TRADEMARK OFFICE
CERTIFICATE OF CORRECTION

PATENT NO. : 5,395,676

DATED : MARCH 7, 1995

INVENTOR(S) : TAKA ET AL

It is certified that error appears in the above-identified patent and that said Letters Patent is hereby corrected as shown below:

On the title page, [63] Continuation of Ser. No. 769,432, "Nov. 19, 1991" should read --Nov. 22, 1991--.

Column 3, line 7, "0,001" should read --0.001--.

Column 6, line 62, "Example 1" should read --Example 4--.

Column 7, line 1, "0.2 μm" should read --0.02 μm--.

Column 7, line 63, "thickness of 3 μ was formed" should read --thickness of 3 μm was formed--.

Column 8, line 55 "0.5" should read --0.5μm--.

Column 10, line 40, "30 mj/ram$^2$" should read --30mj/mm$^2$--.

Signed and Sealed this

Twentieth Day of August, 1996

Attest:

BRUCE LEHMAN

Attesting Officer

Commissioner of Patents and Trademarks